United States Patent
Yim et al.

(10) Patent No.: US 10,050,504 B2
(45) Date of Patent: Aug. 14, 2018

(54) MOTOR STRUCTURE FOR VARIABLE COUNTER ELECTROMOTIVE FORCE

(71) Applicant: Hyundai Motor Company, Seoul (KR)

(72) Inventors: Jeong Bin Yim, Gyeonggi-do (KR); Jae Hwa Jeon, Gyeonggi-do (KR); Dea Woong Han, Gyeonggi-do (KR); Sang Kyu Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 243 days.

(21) Appl. No.: 14/959,645

(22) Filed: Dec. 4, 2015

(65) Prior Publication Data

US 2016/0365760 A1    Dec. 15, 2016

(30) Foreign Application Priority Data

Jun. 15, 2015  (KR) ........................ 10-2015-0083958

(51) Int. Cl.
| | |
|---|---|
| *H02K 21/00* | (2006.01) |
| *H02K 41/00* | (2006.01) |
| *H02K 17/30* | (2006.01) |
| *H02K 1/28* | (2006.01) |
| *H02K 21/02* | (2006.01) |

(52) U.S. Cl.
CPC .................... *H02K 21/024* (2013.01)

(58) Field of Classification Search
CPC ................ H02K 11/00; H02K 16/04
USPC ................. 310/13, 191, 261.1, 125
See application file for complete search history.

(56) References Cited

FOREIGN PATENT DOCUMENTS

| | | | |
|---|---|---|---|
| JP | 11069742 A | * | 3/1999 |
| JP | 2004-166369 A | | 6/2004 |
| JP | 2005-168190 A | | 6/2005 |
| JP | 4120573 B2 | | 7/2008 |
| JP | 2012-100431 A | | 5/2012 |
| KR | 10-2006-0098921 | | 9/2006 |
| KR | 10-2007-0078541 | | 8/2007 |
| KR | 10-2008-0089448 | | 10/2008 |
| KR | 10-2013-0092302 | | 8/2013 |

* cited by examiner

*Primary Examiner* — Jose Gonzalez Quinone
(74) *Attorney, Agent, or Firm* — Mintz Levin Cohn Ferris Glovsky and Popeo, P.C.; Peter F. Corless

(57) ABSTRACT

A motor structure for varying a counter electromotive force is provided. The motor structure includes a rotor that is fixed annularly and concentrically to a radially outside from an exterior circumferential surface of a shaft of an electric motor and has a permanent magnet, and a stator that has coils positioned on the interior side of a motor housing and on the concentrically exterior side with the permanent magnet of the rotor. Further, the coils are positioned spaced apart from each other at predetermined intervals. A drive unit moves the stator in the axial direction of the shaft to vary the interlinkage flux, by varying an area that the magnetic flux of the permanent magnet of the rotor passes through the coils of the stator.

8 Claims, 5 Drawing Sheets

MOTOR STRUCTURE FOR VARIABLE COUNTER ELECTROMOTIVE FORCE

CROSS-REFERENCE TO RELATED APPLICATION

This application claims under 35 U.S.C. § 119(a) the benefit of Korean Patent Application No. 10-2015-0083958 filed on Jun. 15, 2015, the entire contents of which are incorporated herein by reference.

BACKGROUND

(a) Technical Field

The present disclosure relates to a motor structure capable of varying the counter electromotive force and more particularly, to an improved structure by controlling an area in which magnetic flux of a permanent magnet reaches a core of a stator to suppress the counter electromotive force at a high rotational speed of a motor in an electric vehicle.

(b) Background Art

Recently, due to the adverse effect of environment caused by air pollution and depletion of fossil fuel, hybrid vehicles and electric vehicles have been developed. The hybrid vehicles utilize an internal combustion engine as a primary power source and utilize an electric motor as an auxiliary power source, and the electric vehicles are types vehicles that utilize an electric motor as a primary power source.

Operating conditions of the electric vehicle motors require a low-speed high torque when ascending and incline, and require high-speed low torque when operating at high speed such as driving on the highways. Accordingly, a permanent magnet synchronous motor that uses a permanent magnet in a rotor has been developed. However, in a motor that uses a permanent magnet, the counter electromotive force is generated in proportion to the rotational speed of the motor due to the magnetic flux produced by the permanent magnet. To operate the motor at high revolutions per minute (rpm), an increase in the counter electromotive force due to the permanent magnet that may exceed the voltage limitation value of the motor at a high speed driving should be suppressed.

In particular, a method that suppresses an increase in the counter electromotive force of the permanent magnet by generating a stator flux in an opposite direction of the rotor flux may be utilized. For example, a permanent magnet suppresses the magnetic flux produced by the permanent magnet to suppress an increase in the counter electromotive force in a high-rotational speed region of the permanent magnet motor. However, such method produces a decrease in efficiency and output since it is necessary to supply current independent of torque to control the weak flux.

As examples of the related art for suppressing the increase in the counter electromotive force of the permanent magnet in the permanent magnet motor, discloses a stator module that include first and second stators that are coaxially arranged, are rotatable in a circumferential direction, respectively. Further, coils are wound therearound, respectively. A rotation drive unit rotates the first and second stator in opposite directions at the same angle to adjust an amount of interlinkage flux of the stator based on a rotation angle of the first and second stators, and an electric motor including the same.

Further, as shown in the related art, a generator and a motor in which a plurality of auxiliary rotors rotatable between a stator and a rotor are disposed has been developed and auxiliary rotors have the same rotary shaft as a primary rotor. The rotary shaft is smoothly rotatable by a common bearing, when counter electromotive force occurs the primary rotor and the auxiliary rotor rotate in the same form as a single rotor. A phenomenon having the auxiliary rotor and the primary rotor rotate together does not continuously occur by the counter electromotive force. The auxiliary rotor rotates while a slipping phenomenon continuously occurs between the primary rotors. The auxiliary rotor rotating while the slipping pneomenon occurs rapidly rotates the primary rotor interlinking therewith through the continuous acceleration phenomenon due to a polarity transition. The counter electromotive force due to the slit phenomenon of the permanent magnet reduces the load using the counter electromotive force. However, the motor of the prior art described above causes an increase in a manufacturing cost of the motor and is problematic and difficult to control.

As another example, as schematically shown in FIG. 1, a variable air gap-type permanent magnet motor in which a motor controller 10 is included to operate a hydraulic pressure supply source 11 capable of varying an air gap length between the stator 3 having an armature coil 13 has been developed. The rotor 1 includes a permanent magnet 2, and a disc-type rotor is fixed to a shaft 14. The stator moves axially by a hydraulic piston 7 to vary the size of the air gap between the stator and the rotor, thereby increasing the size of the air gap in a high rpm region to reduce the counter electromotive force.

However, the above-mentioned variable air gap-type permanent magnet motor has a structure in which the stator and the rotor overlap each other rather than an interior rotor-type motor structure which is generally disposed on a radially exterior side of the interior rotor in an electric vehicle. For example, the interior rotor-type of an electric vehicle the size of the air gap in the radial direction with respect to the interior rotor cannot be adjusted or changed.

The above information disclosed in this section is merely for enhancement of understanding of the background of the invention and therefore it may contain information that does not form the prior art that is already known in this country to a person of ordinary skill in the art.

SUMMARY

The present invention provides a motor structure for variable counter electromotive force that improves motor efficiency in a high rotation region by moving a stator support in an axial direction of the motor in an interior rotor structure to reduce a passage area of interlinkage flux of the stator and reduce the counter electromotive force.

In one aspect, the present invention provides a motor structure for variable counter electromotive force that may include a rotor, a stator and a drive unit. For example, the rotor may be fixed annularly and concentrically to a radially outside from an exterior circumferential surface of a shaft of an electric motor and may have a permanent magnet. A stator may have coils that are positioned on the interior side of the motor housing and on the concentrically exterior side with the permanent magnet of the rotor. The coils may be positioned to be spaced apart from each other at predetermined intervals; and a drive unit may move the stator in the axial direction of the shaft to vary the interlinkage flux, and adjust an area in which the magnetic flux of the permanent magnet of the rotor passes through the coils of the stator.

The stator may be fixed to a cylindrical stator support portion slid ably disposed in the axial direction of the shaft by the drive unit on the interior surface of the housing. The drive unit may be configured to actuate the stator support portion to slide by hydraulic pressure. An end portion of the stator support portion may be formed as a piston, the hydraulic pressure may be supplied and discharged from the cylinder unit formed in the housing by a hydraulic pump configured to be adjusted by the controller, and the piston may slide in the axial direction of the shaft.

The drive unit may be configured to actuate the stator support portion to slide by the motor. The drive unit may include a gear unit formed in an output shaft of the motor configured to be rotated by the controller. For example, the cylindrical stator support portion may rotate in screw loosening direction and in a screwing tightening direction in accordance with the normal and reverse rotation of the gear unit of the motor output shaft and moves forward and backward in the axial direction of the shaft. The gear unit 162 of the motor 161 may be screwed to a threaded portion 135 formed on an interior surface of the end portion of the stator support portion 130.

A slide distance of the stator by the drive unit may be variably adjusted to decrease in inverse proportionality the interlinkage area in response to an increase in rotational speed. The gear unit of the motor may be screwed to the screw portion formed on the interior surface of the end portion of the stator support portion.

According to the present invention, the stator support portion may move forward or backward in an axial direction based on the normal and reverse rotation of the motor. Additionally, an area in which the magnetic flux of the permanent magnet of the rotor fixed on the exterior circumferential surface of the shaft passes through the coil may be reduced, and the interlinkage flux is reduced. Accordingly, the counter electromotive force reduction of the motor may be controlled and motor efficiency and an increase in output in a high rotation region.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
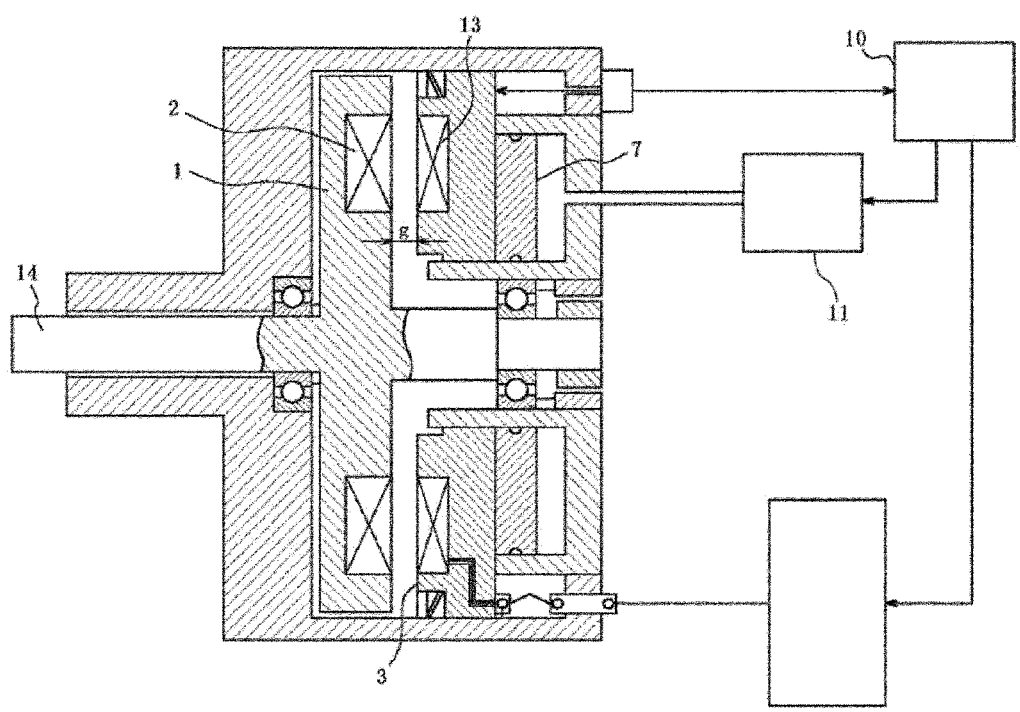
FIG. 1 is an exemplary schematic configuration diagram of a conventional variable air gap-type permanent magnet motor for reducing the counter electromotive force according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The permanent magnet motor may be configured to generate the counter electromotive force in proportion to the rotational speed due to the magnetic flux produced by the permanent magnet. Therefore, to drive the motor in high rotation region, the counter electromotive force suppression current unrelated to torque may flow through the stator coils to prevent the rise of the counter electromotive force. The use of the current directly leads to loss and a decrease in efficiency of the motor in high rotation region, the amount of current used in the motor torque may be reduced, and torque may decrease.

The counter electromotive force generated by the permanent magnet motor is represented by the following formula: $e = k \cdot \lambda_f \cdot \omega_{rm}$ (where, e is counter electromotive force, k is a constant, $\lambda_f$ is interlinkage flux, and $\omega_{rm}$, is rotational angular velocity). Further, the relationship between the interlinkage flux and the air gap as an interval between the rotor and the stator is expressed by the following formula: $\lambda \propto A/l_g$ (where, $\lambda$ is interlinkage flux, A is passage area of the interlinkage flux, and $l_g$ is air gap). Therefore, to reduce the counter electromotive force, the interlinkage flux penetrating through the coils provided to the stator by the magnetic flux of the permanent magnet of the rotor may be reduced. The reduction in the interlinkage flux may be achieved by increasing the air gap through which the interlinkage flux passes.

However, when the interior rotor-type in which the rotor is annularly fixed to the shaft and the stator is annularly disposed on the radially exterior side to be spaced apart, as applied to a vehicle an air gap as an interval between the rotor and the stator may not be changed. For example, to suppress occurrence of counter electromotive force in a permanent magnet motor, the stator support portion may be moved in the axial direction of the motor by hydraulic pressure, the interlinkage flux passage area of the stator may be reduced, and the magnitude of the interlinkage flux may be reduced, thereby reducing the counter electromotive force.

Figure 2:
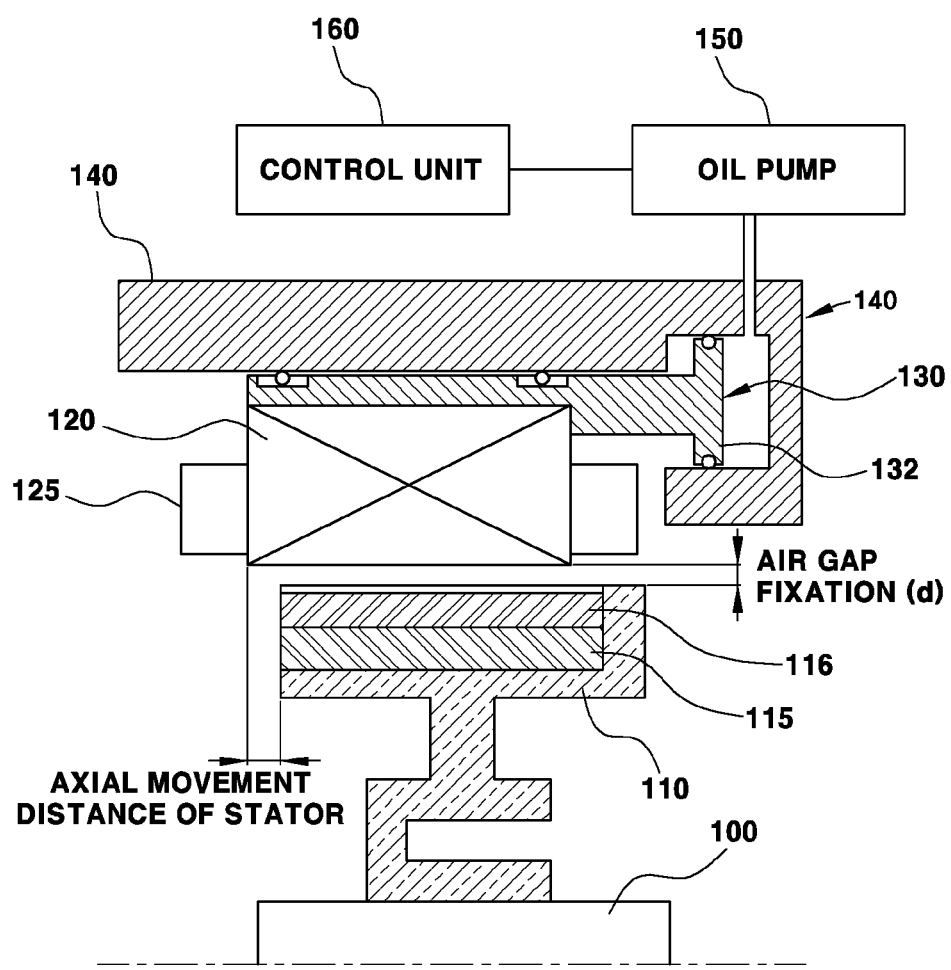
FIG. 2 is an exemplary schematic diagram of a motor structure for variable counter electromotive force according to an exemplary embodiment of the present invention.

In particular, as shown in FIG. 2, the present invention may include a rotor disposed and fixed annularly and concentrically to the radially exterior side from the exterior circumferential surface of the shaft 100 of the electric motor. A stator 120 may be disposed and fixed concentrically with the rotor on the interior side of the motor housing 140, and a drive unit may cause the stator to axially slide with respect to the housing to change the interlinkage flux.

According to an exemplary embodiment, the rotor may include an annular fixing member 110 fixed radially outward from the exterior circumferential surface of the motor shaft, an annular rotor core 115 positioned on the fixing member 110 to form a concentric circle with the shaft, and a permanent magnet 116 fixed to the upper surface of the rotor core. Moreover, a stator 120 may be concentrically outward and slidably mounted to position the permanent magnet of the rotor inside the housing. The coil 125 may be wound around the stator, and although it is not shown in the drawings, a power supply may be connected to the coil. Thus, when the current source is applied to the coil 125 of the stator, as the permanent magnet 116 of the stator rotates by the magnetic field generated in the coil based on the Fleming's left-hand rule, the shaft may rotate.

Accordingly, by varying the opposite position of the stator facing the rotor that may be fixed to the shaft and rotates, the area that passes through the coil of the stator may reduce the magnetic flux of the permanent magnet of the rotor. The magnitude of the interlinkage flux may be reduced, and thus, the counter electromotive force generated in proportion to the rotational speed may be reduced due to the magnetic flux produced by the permanent magnet.

In particular, in the drive unit, a stator support portion 130 for supporting the stator 120 may be disposed to slide in the axial direction of the shaft on the interior surface of the housing 140. Further, an end of the stator support portion 130 may be formed as a piston 132, and the piston may slide in the axial direction by the hydraulic pressure supplied to the cylinder unit 141 formed in the housing 140. Oil may be supplied to or discharged from the cylinder unit 141 by an oil pump 150 drivable in forward and backward directions and operated by the controller 160. Accordingly, the stator support unit 130 axially slides within the housing 140 in a lateral direction of the drawings. The stator support unit 130 may be formed in a cylindrical shape.

Figure 3:
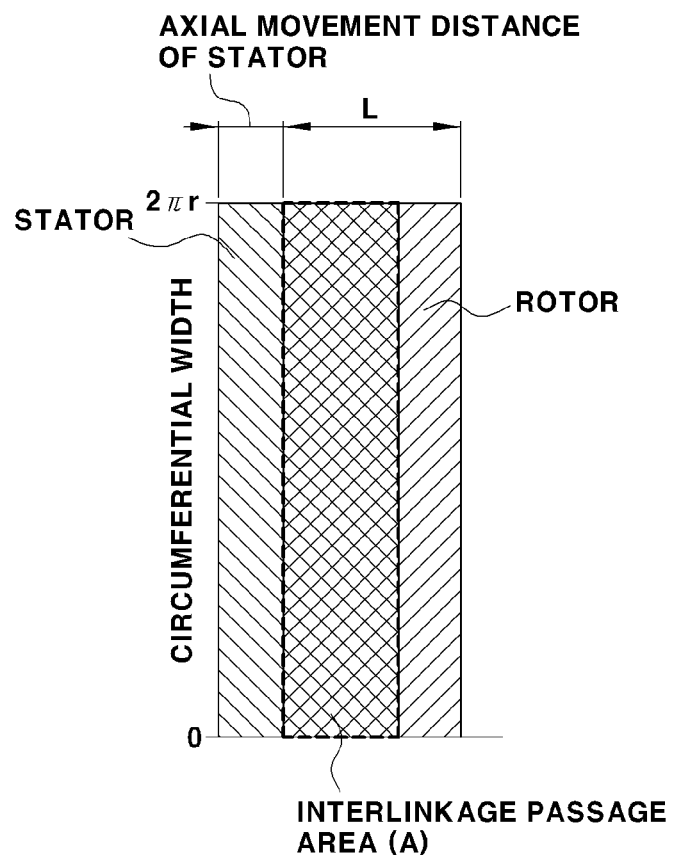
FIG. 3 is an exemplary diagram illustrating changes in the passage area in the interlinkage flux that correspond to the axial moving distance of the stator in the motor structure of FIG. 2 according to an exemplary embodiment of the present invention.
Figure 4:
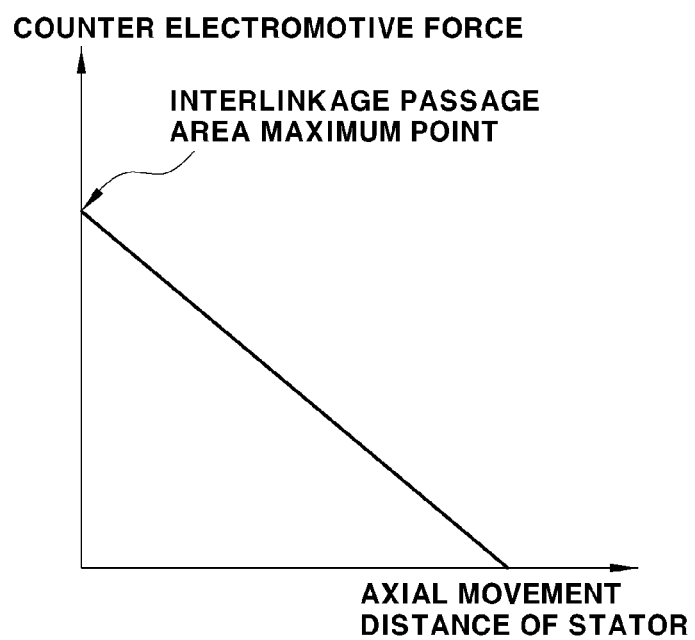
FIG. 4 is an exemplary graph illustrating a change in the counter electromotive force of the axial moving distance of the stator at a fixed rpm in FIG. 3 according to an exemplary embodiment of the present invention.

Further, as the stator 120 provided with the coil at a position facing the permanent magnet 116 of the rotor slides in a horizontal direction, the interlinkage flux in which the magnetic flux of the permanent magnet passes through the coil of the stator may decrease. In other words, as the rotational speed of the rotor increases, the stator positioned toward (e.g., to face or adjacent to) the permanent magnet of the rotor slides in the axial direction. An area in which the magnetic flux of the permanent magnet of the rotor passes through the coil wound around the stator, (e.g., a cylindrical area) decrease as shown in FIG. 3. The area where interlinkage flux passes may decreases inversely proportional to the distance that the stator moves in the axial direction as schematically shown in FIG. 4, and thus, the counter electromotive force decreases.

Figure 5:
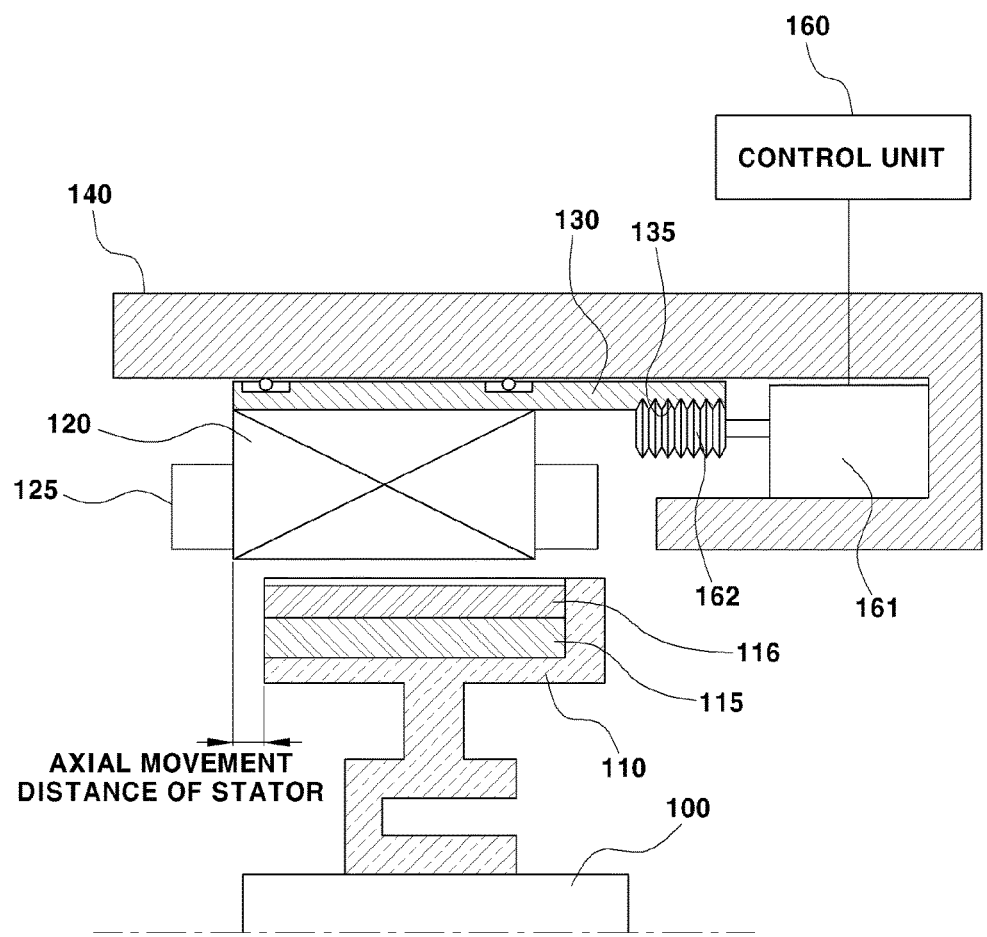
FIG. 5 is an exemplary schematic diagram of the motor structure for variable counter electromotive force of an exemplary embodiment different from FIG. 2 according to an exemplary embodiment of the present invention.

FIG. 5 is an exemplary embodiment of a drive unit that moves the stator by the hydraulic pressure in FIG. 2. The drive unit operated by a controller 160 exterior to the housing. A gear unit 162, may be formed on an output shaft of the motor 161 and may be configured to rotate, by being coupled (e.g., screwed) to the cylindrical stator support portion 130. The motor 161 may be mounted on an interior side of the end of the housing and may be rotated in normal and reverse directions by the external controller 160. The gear unit 162 may be formed at the end of the output shaft of the motor and may be screwed with a threaded portion 135 formed on the interior surface of the stator support portion 130.

Accordingly, during the normal rotation of the motor 161, the gear unit 162 of the output shaft may rotate in a screw loosening direction, the gear portion and the stator support portion 130 may be coupled (e.g., screwed) with the threaded portion 135 on the interior surface axially slide on the interior surface of the housing to move forward and away from the motor 161. During the reverse rotation of the motor, the gear unit 162 may rotate in the screwing direction, the stator support portion 130 may move backward and slide axially in a direction approaching the motor on the housing interior surface.

The slide distance of the stator may be variably adjusted to reduce the interlinkage area in response to an increase in rotational speed and reduce occurrence of counter electromotive force in an inversely proportional manner. For example, the stator support portion 130 may be screwed with the gear unit 162 of the output shaft of the motor to axially move forward or backward based on the normal and reverse rotation of the motor. In other words, a decrease in an area in which the magnetic flux of the permanent magnet 116 of the rotor fixed on the exterior circumferential surface of the shaft passes through the coil 125 of the stator 120 may occur. The interlinkage flux may decrease, and thus, a decrease in the counter electromotive force of the electric motor may be adjusted.

The present invention is not limited to the configurations of the exemplary embodiments described above, it is obvious that the components of the exemplary embodiments described above can be changed or modified to perform substantially the same functions by those skilled in the art, and the structure of the motor of the present invention is not limited to a motor vehicle, and the present invention is limited only by the scope of the appended claims. The present invention can be used to effectively and easily vary the counter electromotive force, by changing an area in which the interlinkage flux passes through the coil in a motor used in the vehicle or the like.

The invention has been described in detail with reference to preferred exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method of varying a counter electromotive force in a motor, comprising:
    fixing a rotor annularly and concentrically to radially outside from an exterior circumferential surface of a shaft of an electric motor and having a permanent magnet;
    positioning a stator having coils on the interior side of a motor housing and on the concentrically exterior side with the permanent magnet of the rotor and positioned to be spaced apart from each other at predetermined intervals; and
    operating a drive unit configured to move the stator in the axial direction of the shaft to vary the interlinkage flux, by adjusting an area that the magnetic flux of the permanent magnet of the rotor passes through the coils of the stator,
    wherein a slide distance of the stator by the drive unit is variably adjusted to decrease by an inverse proportionality the interlinkage area in response to an increase in rotational speed of the motor so as to reduce occurrence of counter electromotive force of the motor.

2. The method of claim 1, wherein the stator is fixed to a cylindrical stator support portion slidably disposed in the axial direction of the shaft by the drive unit on the interior surface of the housing.

3. The method of claim 2, wherein the drive unit is configured actuate the cylindrical stator support portion to slide by hydraulic pressure.

4. The method of claim 3, wherein an end portion of the cylindrical stator support portion is formed as a piston the hydraulic pressure is supplied to and discharged from a cylinder unit formed within the housing by a hydraulic pump operated by a controller, and the piston slides in the axial direction of the shaft.

5. The method of claim 2, wherein the drive unit is configured to actuate the cylindrical stator support portion to slide by a motor.

6. The method of claim 5, wherein the drive unit forms a gear unit in an output shaft of the motor configured to be rotated y the controller and is coupled to the cylindrical stator support portion, rotates in a loosening and tightening direction based on the normal and reverse rotation of the gear unit of the motor output shaft, and moves forward and backward in the axial direction of the shaft.

7. The method of claim 6, wherein the gear unit of the motor is screwed to a threaded portion formed on an interior surface of the end portion of the stator support portion.

8. The method of claim 6, wherein the gear unit of the motor is coupled to an interior surface of the end portion of the stator support portion.

* * * * *